United States Patent [19]

Shimoi

[11] Patent Number: 4,733,386

[45] Date of Patent: Mar. 22, 1988

[54] METHOD OF WRITING FILE DATA INTO A WRITE-ONCE TYPE MEMORY DEVICE

[75] Inventor: Kenji Shimoi, Kodaira, Japan

[73] Assignee: Hitachi, Ltd., Tokyo, Japan

[21] Appl. No.: 857,087

[22] Filed: Apr. 29, 1986

[30] Foreign Application Priority Data

May 2, 1985 [JP] Japan .................................. 60-93616

[51] Int. Cl.$^4$ .......................... G11B 5/76; G11B 15/52
[52] U.S. Cl. ......................................... 369/59; 369/47
[58] Field of Search ................ 369/59, 47, 48; 360/48

[56] References Cited

U.S. PATENT DOCUMENTS 4,587,643  5/1986  Monen et al. ........................ 369/59

Primary Examiner—Vincent P. Canney
Attorney, Agent, or Firm—Antonelli, Terry & Wands

[57] ABSTRACT

First label data including a file name, a location at which the writing of the file data is to be started, and a particular end address is written into a file label area before the file data of a file is written, the file data is written from the above-described writing start location, the first label data is invalidated after the end of writing, and second label data including the file name, the location at which the writing of the file data is to be started, and the end address of the area in which the file data has been actually written is then written after the writing has been finished.

11 Claims, 7 Drawing Figures

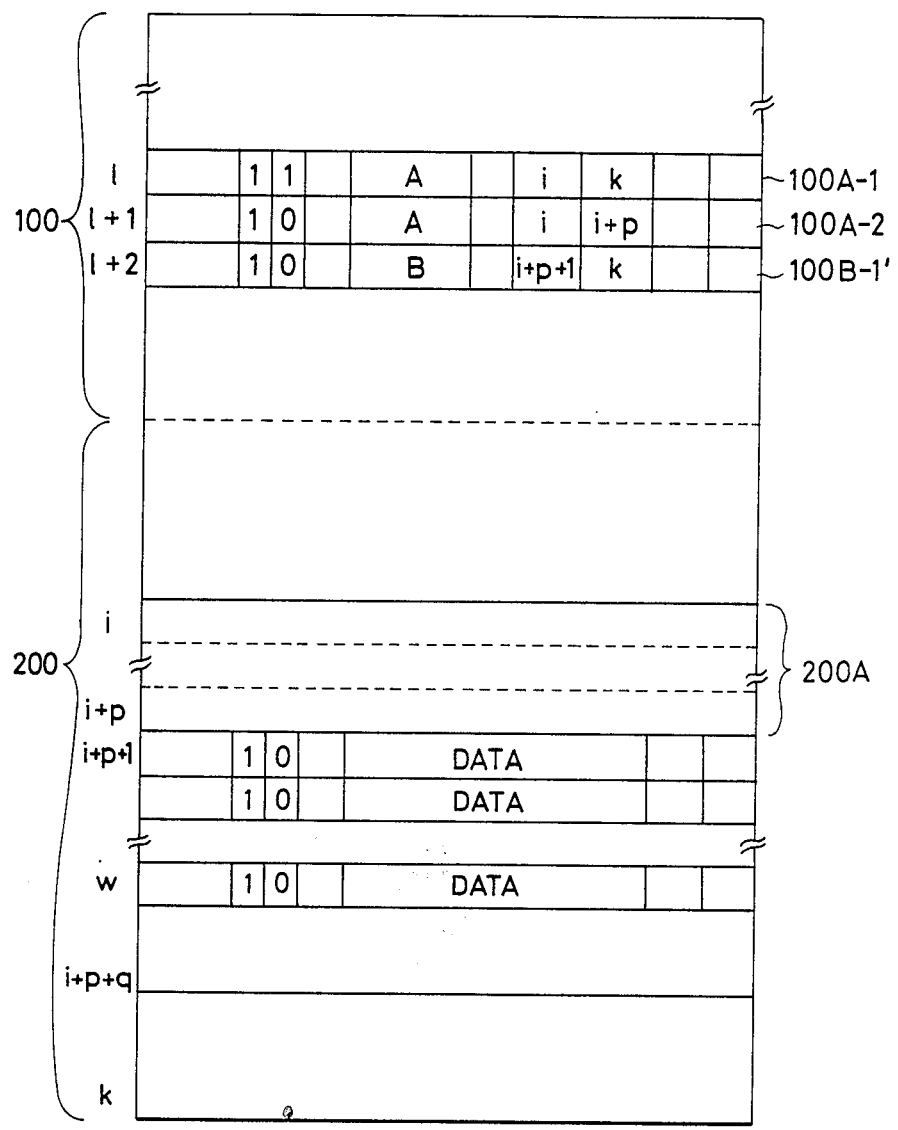

METHOD OF WRITING FILE DATA INTO A WRITE-ONCE TYPE MEMORY DEVICE

BACKGROUND OF THE INVENTION

The present invention relates to a method for controlling the writing of file data into a write-once type memory device (for example, a write-once type optical disc).

A conventional write-once type optical disc used as a data file has been operated on the basis of a method in which, when new file data is written, users determine the file name and data capacity required for the file, and then write the file data. However, accurate estimation of the required data capacity is very difficult. Therefore, users have a tendency to determine an extremely large data capacity which is greater than that actually required for the data, resulting in a large area in which nothing is written and, as a result, the efficient space utilization of the data file will decrease. The conventional optical disc also has disadvantages in that, when a cause for writing interruption such as a power failure occurs, the data area which has been occupied can no longer be employed, the non-written area thus being further increased and the efficiency of space utilization of the optical disc being decreased even more.

SUMMARY OF THE INVENTION

It is an object of the present invention to provide a method of writing file data for a write-once type memory device, which can easily detect and utilize non-written data areas in which no data is written even if a writing interruption or another problem occurs during data writing.

In order to attain this object, in accordance with the present invention, first label data including a file name, a location at which the writing of the file data is to be started, and a particular end address is written into a file label area before the file data of this file is written, the file data is written from the above-described writing start location, the first label data is invalidated after the end of writing, and second label data including the file name, the same writing start location, and the end address of the area in which the file data has been actually written is then written after the data write process has been finished.

BRIEF DESCRIPTION OF THE DRAWINGS

6 is a view showing an example of the memory contents when a cause for writing interruption occurs in the system shown in FIG. 1; and FIG. 7 is a view showing an example of the label data after the end of the processing shown in FIG. 5.

DETAILED DESCRIPTION OF PREFERRED EMBODIMENT

Figure 1:
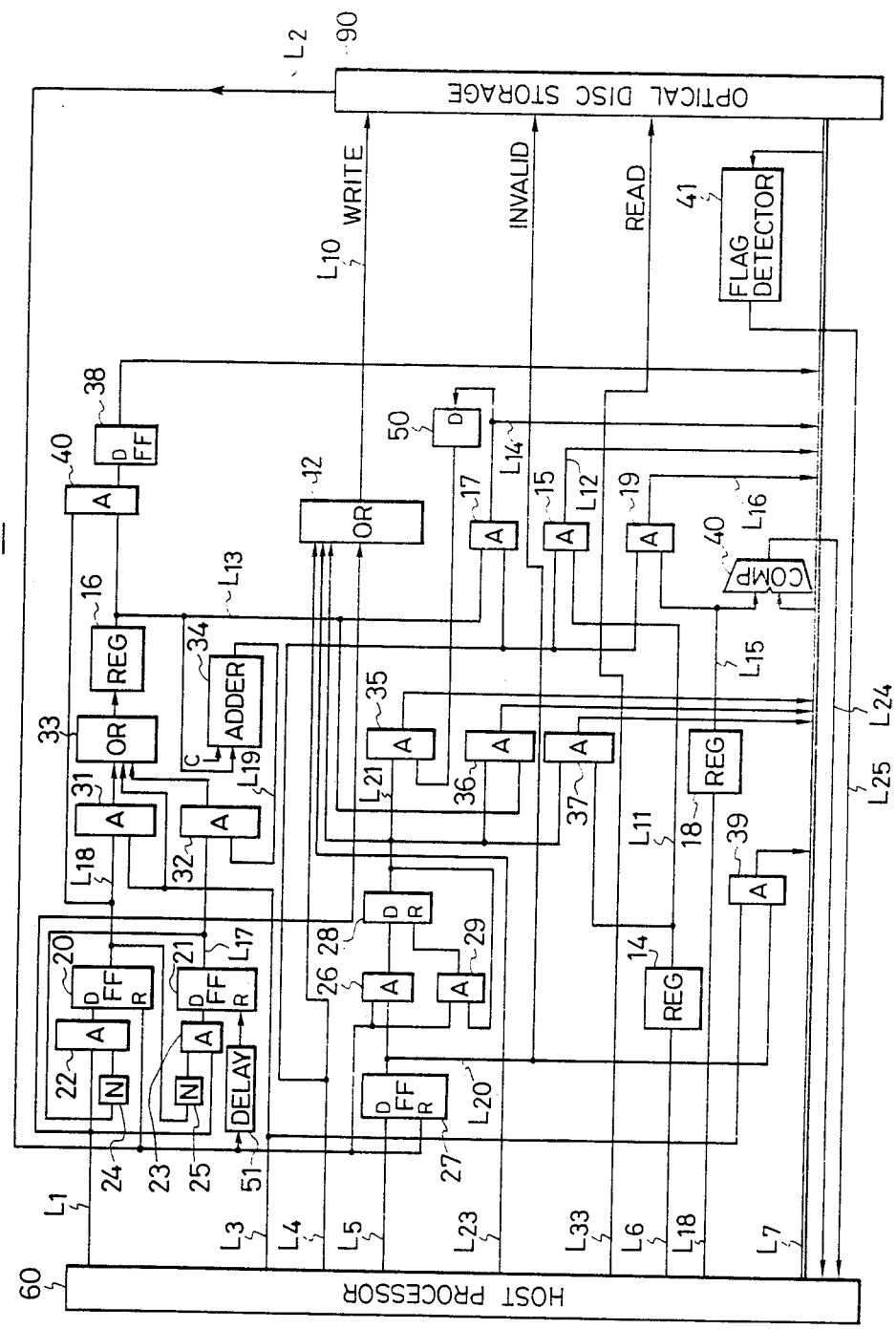
FIG. 1 is a view showing an embodiment of a data processing system to which the present invention is applied.

In FIG. 1, a host processor 60 sends a command to an optical disc memory device 80 connected thereto through a high-speed channel (not shown in the figure) and accesses an optical disc memory device 90.

The memory area in the optical disc memory device 90 has a plurality of memory areas having a concentric circle or spiral form which are called tracks, each track being divided into memory areas of a given length called a sector and the reading and writing of data being carried out in a sector unit by specifying an address comprising a track number and a sector number.

Figure 2:
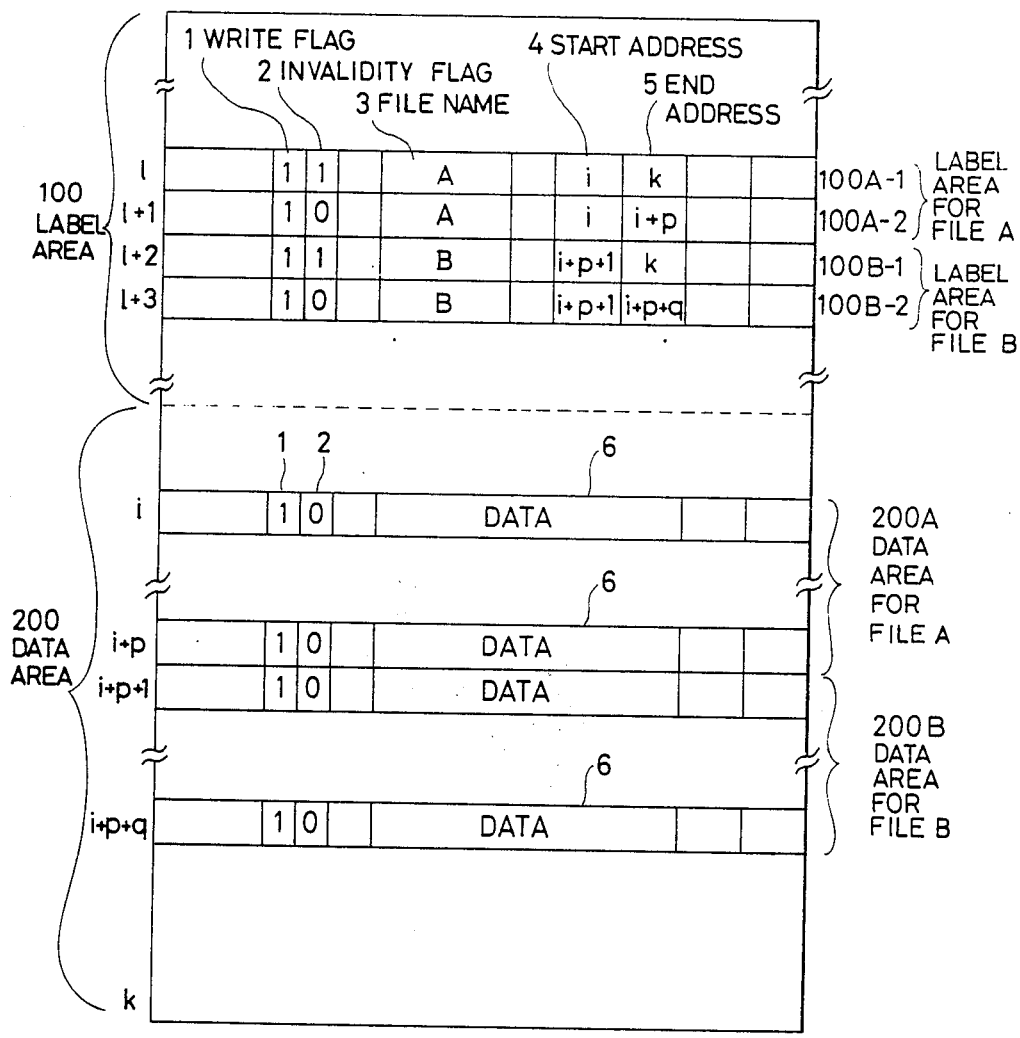
FIG. 2 is a view showing the formats of a file label and file data which are written into an optical disc memory device in the system shown in FIG. 1.

The optical disc as file data memory is divided into a label area 100 for holding a plurality of file labels as a whole and a data area 200 for holding file data of a plurality of files as a whole. In this embodiment, the label area 100 holds two file labels for each file, as shown in FIG. 2. Namely, as shown in FIG. 2, the label area of a file A comprises a first label 100 A-1 recorded in a sector 1 and a second label 100 A-2 recorded in a sector 1+1. The label of a file B also comprises two labels: 100 B-1 and 100 B-2.

The data area 200 of this embodiment differs from the conventional storage system in that the data areas of a plurality of files are continuously provided therein without any space therebetween. That is to say, in the embodiment shown in FIG. 2, the data area 200 A of the file A occupies sectors from i to i+p. The data area 200 B of the file B occupies sectors from i+p+1 to i+p+q.

In this embodiment, the sector in the label area 100 comprises a writing flag field 1, an invalidity flag field 2, a file name field 3, a start address field for this data area 4, an end address field 5, and other fields. The other fields will not be described because they do not directly relate to the present invention. Each sector of the data area 200 comprises the writing flag field 1, the invalidity flag field 2, a data field 6, and other fields. The other fields will not be described either as they do not directly relate to the present invention. The writing flag field 1 is set at 1 when the file label or file data is written into the sector. "1" is written into the invality flag field 2 when the file label or the file data written into the sector is invalidated.

Figure 3:
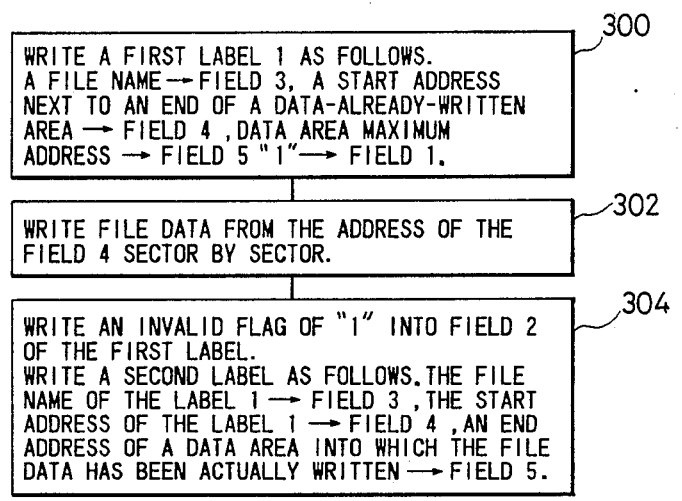
FIG. 3 is a flow chart of writing processes of the file label and the data file in the system shown in FIG. 1.

Next, the procedure for recording the file label and the file data in FIG. 2 will be described for the case of file B with reference to FIGS. 3 and 4.

When a command is made for file B to be occupied by a user program, the first label 100 B-1' of the file B (FIG. 4) is recorded in a sector 1+2 next to the second label 100 A-2 of the file A which has been already written into the label area 100. During this process, a file name B specified by the user program is written into a file name field 3 of the first label 100 B-1' of the file B, the address of a sector next to the data-already-written area in the data area 200, that is the address of a sector next to the data area 200 A of the file A (i+p+1) in this case, is written into a start address field 4, a data area maximum address k is written into an end address field 5, and "1" is written into a writing flag field 1 (Step 300).

Then, the file data is written into a sector adjacent to the sector i+p+1 in order until no data to be written is present (Step 302).

During this process, "1" is written into the writing flag field 1 of the sector in which the data is written.

Figure 4:
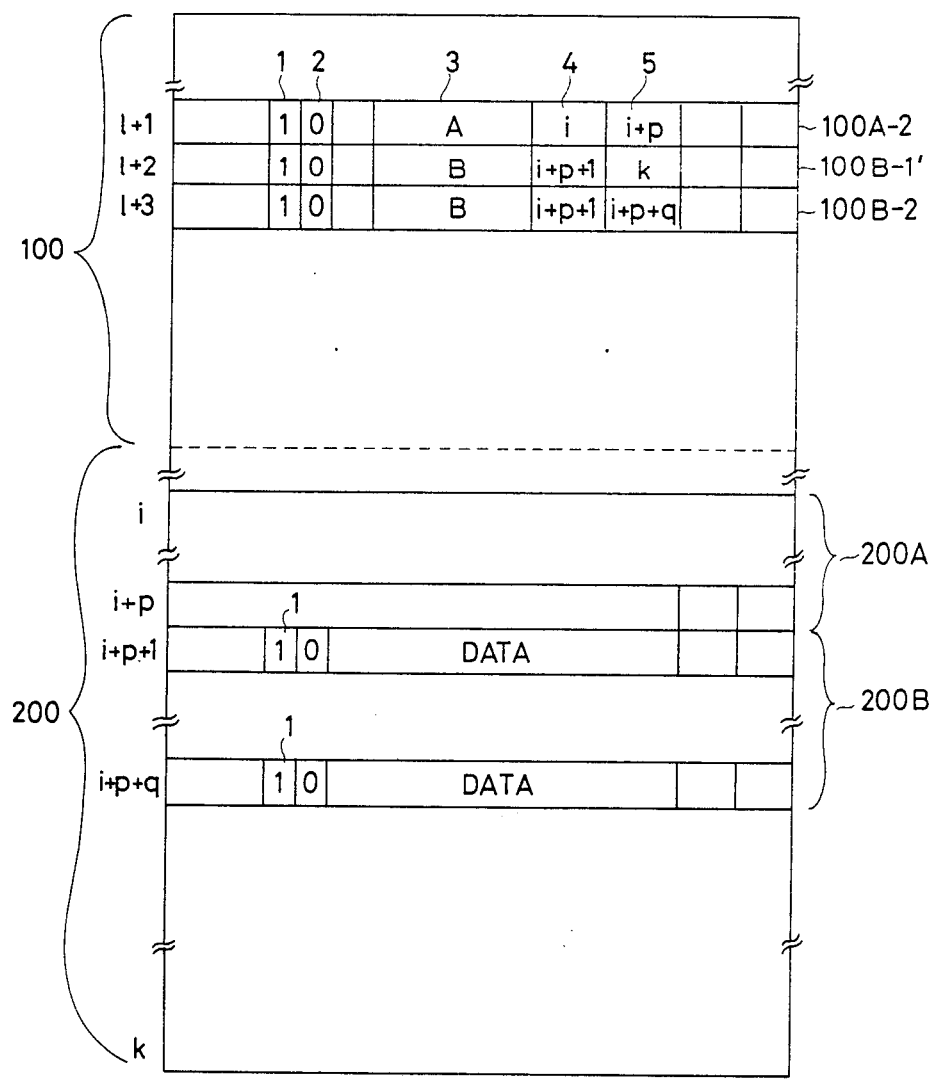
FIG. 4 is a view showing one of the results obtained in the course of the writing of the file label and file data in the system shown in FIG. 1.

In such a manner, as shown in FIG. 4, the data area 200 B of file B comprises the sectors from $i+p+1$ to $i+p+q$.

After all the data has been completely written, the second label 100 B-2 of the file B is written into a sector $1+3$ following the first label 100 B-1′ as follows:

A file name B which is the same as the file name of the first label and a start address which is the same as the start address $i+p+1$ are written into the second label 100 B-2 and the address $i+p+q$ of the end sector of the data area B of file B is written into the end address field 5 of the second label. "1" is written into the writing flag field 1. The invalidity flag field 2 of the first label 100 B-1 is set at "1" (Step 306). In such a manner, the label 100 B-2 is written as shown in FIG. 2. The invalidity flag field 2 of the first label 100 B-1 of the file B is set at "1" before the second label of file B is written (step 304). FIG. 4 shows the state before the invalidity flag field 2 of the first label 100 B-1′ of file B is set at "1". In this manner, the first and second labels 100 B-1 and 100 B-2 are formed as shown in FIG. 2.

The second label 100 B-2 is finally utilized as the label of file B, while the first label 100 B-1 is usually not utilized as a file label because the invalidity flag 2 is set at "1". However, the first label 100 B-1 is utilized for rapidly detecting the sector of the data area 200 up to which data has been written when the cause of a data-writing interruption, such as a power failure or a careless program operation, occurs while the data is being written into file B, as described hereinafter.

Subsequently, when request is made for file C to be occupied by a user program, a file label and file data are written in the same manner as those for file B. Of course, the data area of file C is started at the sector $i+p+q$ next to the data area 200 B of file B. In this manner, data of various files is contiguously stored in the data area 200, so that it can be utilized without leading any vacant space.

When one of the above causes of a writing interruption occurs, the host processor must invalidate the file in which the data writing was interrupted. The operations of this embodiment will be described below with reference to FIGS. 5 and 6. In this case, only the first label 100 B-1′ of file B has been written; and the second label 100 B-2 has not yet been written, as shown in FIG. 6. In FIG. 6, it is assumed that the data of file B has been written into the sectors from $i+p+1$ to w. The label in the label area 100 is to be read (Step 400). A judgement is made as to whether the end address in the label field 5 is equal to or not equal to the data area maximum address K (Step 402). This judgement is carried out only for labels whose invalidity flag field 1 is not "1", i.e., for valid labels. If equality is not detected by this judgement, Steps 400 and 402 are repeated for the next label. If equality is detected in the Step 402, the data of the start address (in this case, $i+p+1$) sector in the start address field 4 of the label (in this case, label 100 B-1′) is read (Step 404). A judgement is made as to whether or not data is written in that sector, judging whether or not the write flag of the read sector is 1 (Step 406). If data is written in that sector, the next sector is read (Step 408) and the judgement of Step 406 is again carried out. In this manner, access to the final sector (in this case, w) in which data is written is completed. The invalidity flag field 2 of the first label 100 B-1′ of file B is set at "1" (Step 410). Next, the second label 100 B-2 comprising the file name B, the start address $i+p+1$ which has been read beforehand from label 100 B-1′ of file B, and the end address w which is the same as the address of the end sector in which the data of file B is written is written (Step 412). During this time, the write flag w of label 100 B-2 is clearly set at "1". "1" is then written into the invalidity flag field 2 of the second label 100 B-2, to invalidate that label (Step 414). FIG. 7 shows the first and second labels of file B, 100 B-1″ and 100 B-2′, after the above-described processing is finished. As can be seen from FIG. 7, the end address w of the second label 100 B-2′ is the same as the address of the end sector w of the data-written area in the optical disc memory device.

Therefore, when new file data is to be written into this memory device, the host processor can read the labels in label area 100 in sequence, and select the address which differs from the system limit address k in the end address in the address field 5, and also the maximum value; or can detect the sector of the data area 200 up to which data has been written by reading the end address in the label which has been written at the end of the labels in the label area.

If this end address w is not written into the disc, the host computer would have to read the data area 200 in sequence to detect the end address at which data is written. However, this method takes time and necessitates an optical disc of a large data memory capacity, and is thus unsuitable for practical application.

The method of writing data according to this embodiment has an advantage in that, when this optical disc device is connected to another computer, that computer can detect the position of the end sector of those in which data is written, by just reading the label area at a similar high speed.

The above-described processes will be described in detail hereinafter with reference to the embodiment shown in FIG. 1.

First, the processing of the device (Step 300 in FIG. 3) will be described, using file B in FIG. 4 as an example, when a request is newly made by the user program for a file to be occupied.

The host processor 60 has already set the data area maximum address k in a register 18 of the optical disc control device 80 through a line L18.

When a request is made by the user program for a file to be secured, the host processor 60 operates as described below in order to write the label data for file B.

The host processor 60 outputs a file allocation command to a line L4, the file name (B, for FIG. 4) specified by the user program to a line L6, and the address of the sector in which the label data of the requested file is to be held to a line L3. The allocation command on the line L4 is input to an OR gate 12. An output L10 of the OR gate 12 is sent to the optical disc memory device 90 as a write command. After the file name on the line L6 is set in a register 14, it is sent to the optical disc memory device 90 through an AND gate 15 which is opened by the allocation command L4, a line L12, and a bus L7. As described below, the address ($i+p+1$ in FIG. 4) of a sector of the optical disc memory device 90 is held in a register 16. This address $i+p+1$ is sent to the optical disc memory device 90 through a line L13, an AND gate 17 which is opened by the allocation command L4, a line L14, and the bus L7. This address is also held in a flip-flop 50. The data area maximum address (k) recorded in the register 18 is sent to the optical disc memory device 90 through an AND gate 19 which is opened by the allocation command L4, and the bus L7.

The optical disc memory device 90 writes the label 100-1' (FIG. 4) by the write command L10, based on the file name, the data-written start sector address (i+p+1), and the data area maximum address (k) which are sent from the bus L7. In this process, the write flag "1" is generated and written by the optical disc memory device 90.

Subsequently, when the host processor responds to a data transfer request from the user program, it operates as described below (Step 302 in FIG. 3).

The host processor 60 outputs the write command to a line L1, the data-writing start address (i+p+1) to the line L3, and the data to be written to the bus L7, in response to this data transfer request.

The write command L1 is input to the OR gate 12. The output L10 of the OR gate 12 is sent to the optical disc memory device 90 as the write command.

During this time, a flip-flop 21 remains reset (the setting of this flip-flop will be described hereinafter). Therefore, since the output of a NOT gate 24 to which this output is input is "1", an AND gate 22 is opened. Thus, the write command L1 is sent to a flip-flop 20 to set it. The output L18 of the flip-flop 20 opens an AND gate 31, and the data-writing start address (i+p+1) which is sent through a line L3 is set in the register 16 through the AND gate 31 and an OR gate 33. The output address of the register 16 is set in a flip-flop 38 through an AND gate 40 opened by the output L18 of the flip-flop 20, and is then sent to the optical disc memory device 90 through the bus L7. In this manner, the optical disc memory device 90 writes the data on the bus L7 into the sector whose address (i+p+1) is given from the flip-flop 38 and the bus L7. After this write is finished, the optical disc memory device 90 outputs an operation end signal to a line L2, and this signal resets the flip-flop 20. The output of a NOT gate 25 to which the output 18 of the flip-flop 20 is input becomes "1", an AND gate 23 is opened, the flip-flop 21 is turned on by the write command on a line L1, and the output 17 thereof opens an AND gate 32. A next sector address L19 (in this case, i+p+2), which is obtained by adding the output of the register 16 (in this case, i+p+1) to a constant C (in this case, "1") by an adder 34, is input to the AND gate 32, the address being set in the register 16 through the OR gate 33. The operation end signal on line L2 is delayed by a delay circuit 51 and resets the flip-flop 21. This completes the data-writing cycle for one sector.

The data accompanied by the write command L1 is then continuously sent to the bus L7 in synchronism with the write command by the host processor 60. The optical disc control device repeats the above operations. During these operations, the address in the register 16 is nerewed in sequence by the adder 34, the new address being sent to the optical disc memory device 90 through the AND gate 40, the flip-flop 38, and the bus L7. This write operation is repeated until the data which the user program has requested to be transferred has all been written. In this manner, the data is written into sectors i+p+1 to i+p+q, as shown in FIG. 4, while the optical disc memory device 90 generates and writes the write flag data "1".

The operation (Step 304 in FIG. 4) when there is no more data to be written will now be described.

First the following process is executed to invalidate the first label.

When there is no more data to be written, the host processor 60 first outputs a label renewal command to a line L5 and the address l+2 of the label 100 B-1' of file B to the line L3. The label renewed command L5 sets a flip-flop 27, an output L20 thereof being sent to the optical disc memory device 90 as an invalidity command. The output L20 of the flip-flop 27 then opens an AND gate 39. The address l+2 given by the line L3 is sent to the bus L7 through the AND gate 39. The optical disc memory device 90 writes "1" into the invalidity flag field 2 of the sector of the label address l+2 in response to the invalidity command L20.

The second label is then written. The operation end signal L2 output from the optical disc memory device 90 after the first label is invalidated, as described above, opens the AND gate 26 and sets a flip-flop 28. A set output L21 of the flip-flop 28 is sent to the OR gate 12, the output L10 thereof being sent to the optical disc memory device 90 as a write command. The output L21 of the flip-flop 28 opens the AND gates 35 to 37, and the start address (i+p+1) of the data area of file B in the register 50, the end address (i+p+q) of the data area of file B in the register 16, and the file name (B) in the register 14 are sent to the bus L7 through the AND gates 35, 36, and 37, respectively. The host processor 60 outputs the address of the sector (l+2) into which the second label is to be written to the bus L7. The optical disc memory device 90 writes the second label 100 B-2 (FIG. 4) containing the file name B on the bus L7, the data area start address i+p+1, and the end address i+p+q, in response to the write command L10 and the address l+2 on the bus L7.

An AND gate 29 is opened by the operation end signal L2 which is output after this write operation has been finished, and by the output of the flip-flop 28, thus resetting flip-flop 28.

As described above, the normal writing of the file label and the file data are now completed.

Figure 5:
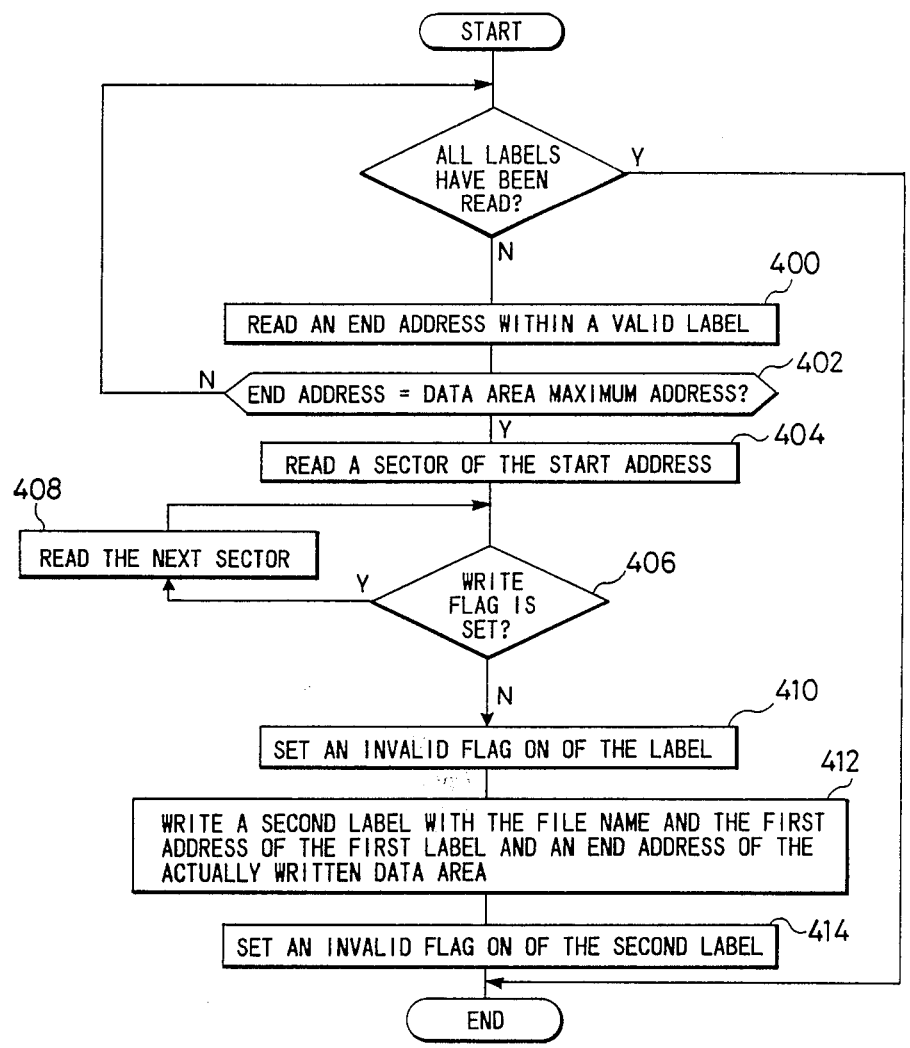
FIG. 5 is a flow chart of the processing after a cause for writing interruption occurs in the course of writing of the file data in the system shown in FIG. 1.

The recovery method employed after an abnormality such as a power failure has occurred during the writing into the data area will now be described with reference to FIG. 5.

The host processor 60 sends the start address of the label area to the optical disc memory device 90 through the bus L7, in order to read the data which has already been written in the label area in sequence, and sends a read command to the optical disc memory device 90 through a line L33. This starts the reading of the label data on the optical disc (Step 400 in FIG. 5).

The label data to be read is sent to the bus L7. A comparator 40 extracts the contents of the end address area 5 in the label data sent from the bus L7 and compares it with an output L15 of the register 18 in which the end address of the optical disc is recorded. If they have the same value, an output L24 is turned ON; but if they are different, the output L24 is turned OFF, to inform the host processor 60 (Step 402). If the two values are different, the host processor 60 sends the address of the next label to the optical disc memory device 90 through the bus L7, in order to read the next label data. In the same manner, the read command is sent to the optical disc memory device 90 through the line L33.

The above-described operations are repeated until an output L24 of the comparator 40 becomes ON. When the output L24 is turned ON, the label data is recorded by the host processor 60.

Next, the address of the start address area 4 in the label data is transferred to the optical disc memory device 90 through the bus L7 and, at the same time, the read command is sent to the optical disc memory device 90 through the line L33, the data at this address being read (Step 404) and then sent to the bus L7. Only the write flag area 1 in the sent data is sent to a flag detector circuit 41. The circuit 41 is a circuit which is turned ON only if the write flag has detected the not-written state. The output of the circuit 41 is sent to the host processor 60 through a line L25 (Step 406). When this signal is OFF, that is, when the not-written state is not detected, the host processor 60 renews the address of the data area of the optical disc in order to read the next data area, sends the address through the bus L7, and turns the read command L33 ON (Step 408).

The above-described operation is repeated until the output L25 of the flag detector circuit 41 becomes ON. A series of these operations can determine how many sectors in the file in which the abnormality occurred beforehand have been written.

Next, it is necessary to provide a processing which invalidates the file in which the abnormality occurred. For this purpose, an erase command is first output through a line L5 for the purpose of invalidating the label information of this file, the address of the label area is sent to the optical disc memory device 90 through the bus L7, and then the invalidity flag of the label data is turned ON (Step 410). This outputs the write command through the line L1 in order to write the label data in which only the end address is corrected, and it is then sent to the optical disc memory device 90 through the OR gate 12 and the line L10. It is also set in the flip-flop 20 through the AND gate 22, the output L18 of the flip-flop 20 being turned ON thereby. The address of the label area to be written is stored in the register 16 through the lines L3. The outputs L13 and L18 of the register 16 set the AND gate 40, and are then sent to the optical disc memory device 90 through the flip-flop 38 and the bus L7, and the label is written (Step 412).

Next, the label is invalidated by using the lines L5 and L3 in the same manner as that described above, in order to invalidate the written label (Step 414).

The synchronization of the label area with the data area can be conducted by the processing above for a file in which an abnormality has occurred.

Namely, when a new file area is allocated, it is possible to determine the start address of the new file only from the information in the label area. That is to say, it is preferable that the address next to the end address in the last label to be written in the label area containing the label in which the invalidity flag is ON is made the start address of a file which is newly allocated.

What is claimed is:

1. A method for controlling the writing of file data into a storage device of the write-once type, including the steps of:
    writing first label data into said storage device at a predetermined file label area, which is used for holding label data for plural files, in response to an applied request for writing new file data, said first label data including a file name, a start address indicative of a start location of a portion of a predetermined data area of said storage device in which no file data has been written, which data area is used for holding file data of said plural files, and a predetermined end address;
    writing the requested file data into said portion of said data area starting from said start address and writing a signal for invalidating the first label data in said file label area after the writing of the requested file data; and
    writing second label data into the file label area after writing said invalidating signal therein, said second label data including the file name, the start address and an end address of the area in which the requested file data has actually been written.

2. A method according to claim 1, wherein said predetermined end address is equal to or lesser than the end address of the predetermined data area of said storage device.

3. A method for controlling writing of each of a plurality of file data signals of plural files into a storage device of the write-once type in response to a write request for a file data signal of a selected file, comprising the steps of:
    (a) detecting an end address of a portion of a predetermined data area of said storage device in which file data signals of files already have been written;
    (b) writing a label data signal of a first kind into a predetermined label area of said storage device, said label data signal of the first kind including a file name of said selected file, a start address consisting of the address next to the detected end address and a predetermined end address;
    (c) sequentially writing different parts of said file data signal of said selected file into storage locations of said predetermined data area starting from a storage location having an address corresponding to the start address written within said predetermined label area; and after completion of the writing of the file data signal, writing a label data signal of a second kind into said predetermined label area, and thereafter writing into said predetermined label area a signal indicative of invalidity of the label data signal of the first kind.

4. A method according to claim 3, wherein the detection of the end address includes detection of one of said already written label data signals of the second kind which has the largest end address among end addresses included in the label data signals of the second kind written already in the label data area.

5. A method according to claim 3, wherein the detection of the end address includes a detection of the one of said already written label data signals which was written last.

6. A method according to claim 3, wherein the detection of the end address includes detection of an end address included in one of said file label data signals of the second kind which already have been written into said predetermined label area and which correspond to a file whose file data signal was written last.

7. A method according to claim 3, further comprising the steps of:
    (e) searching said predetermined label area for a valid label data signal of the first type having an end address equal to said predetermined end address among label data signals already written in said predetermined label area, in response to a further write request for a file data signal of a file provided after failure of completion of writing of a file data signal of said selected file into said predetermined data area in step (c);
    (f) reading out a start address included in a valid label data signal found in step (e);
    (g) detecting an end address of a portion of said predetermined data area which starts from the start address read out in step (f) and in which portion file data signals were already written;

(h) writing of the label data signal found in step (e);

(i) performing the steps (b) to (d) so as to write the file data signal of the file indicated by said further write request, wherein the end address detected in the step (h) is used in place of the end address detected in the step (a).

8. An apparatus for controlling writing of each of a plurality of file data signals of plural files into a storage device of the write-once type in response to a write request for a file data signal of a selected file, comprising:

(a) means for detecting an end address of a portion of a predetermined data area of said storage device in which file data signals of files already have been written;

(b) means for writing a label data signal of a first kind into a predetermined label area of said storage device, said label data signal of the first kind including a file name of said selected file, a start address consisting of the address next to the detected end address and a predetermined end address;

(c) means for sequentially writing different parts of said file data signal of said selected file into storage locations of said predetermined data area starting from a storage location having an address corresponding to the start address written within said predetermined label area; and (d) means for writing a label data signal of a second kind, after completion of the writing of the file data signal, into said predetermined label area, after completion of the writing of the file data signal and for thereafter writing into said predetermined label area a signal indicative of invalidity of the label data signal of the first kind.

9. An apparatus according to claim 8, wherein said means for detecting the end address includes means for detection of an end address included in one of said file label data signals of the second kind which already has been written into said predetermined label area and which corresponds to a file whose file data signal was written last.

10. An apparatus according to claim 8, wherein said detecting means includes means for detection of one of said already written label data signals of the second kind which has the largest end address among end addresses included in the label data signals of the second kind written already in the label data area.

11. An apparatus according to claim 8, wherein said detecting means includes means for detection of the one of said already written label data signals which was written last.

* * * * *